J. H. PENDLETON.
COFFEE-HULLER.

No. 190,614.                              Patented May 8, 1877.

Witnesses
Chas. H. Smith
Harold Serrell

Inventor
John H. Pendleton.
for Lemuel W. Serrell
atty

UNITED STATES PATENT OFFICE.

JOHN H. PENDLETON, OF BROOKLYN, ASSIGNOR TO HIMSELF AND ALEXANDER H. TIERS, OF NEW YORK, N. Y.

IMPROVEMENT IN COFFEE-HULLERS.

Specification forming part of Letters Patent No. 190,614, dated May 8, 1877; application filed April 3, 1877.

*To all whom it may concern:*

Be it known that I, JOHN H. PENDLETON, of Brooklyn, in the county of Kings and State of New York, have invented an Improvement in Coffee-Hullers, of which the following is a specification:

Coffee-hullers have been made with a revolving cylinder of rubbers upon both vertical and horizontal shafts, and these have been incased with a cylinder that is more or less yielding, so as not to injure the berries.

My present invention relates to a cylinder revolving upon a horizontal shaft, and having a corrugated rubbing-surface, in combination with a frame surrounding the same, and sustaining a range of yielding rubbers, that serve to crack off and remove the hull, and also the skin, of each of the berries, so as to deliver the grains of coffee ready for roasting and grinding.

Figure 1:
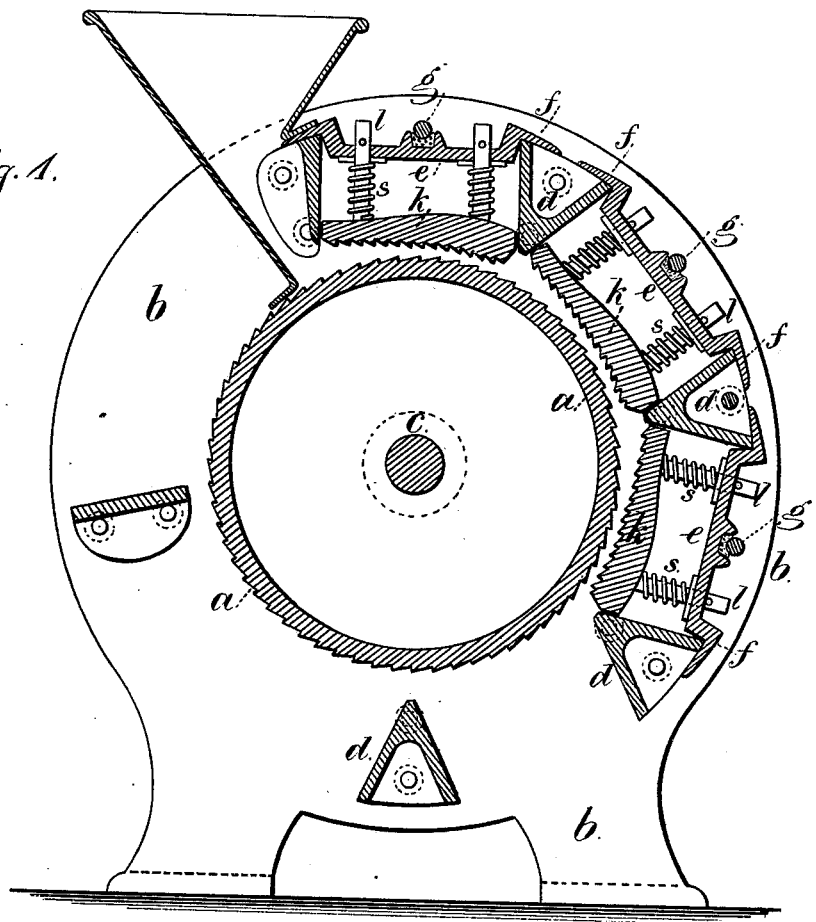
Figure 2:
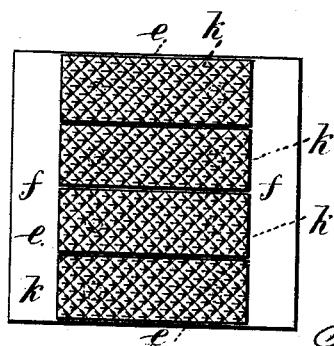

In the drawing, Figure 1 is a vertical section of the huller, and Fig. 2 a detached face view of one of the rubbers.

The cylinder $a$ is between two frames or plates, $b$, and the shaft $c$ of the said cylinder is supported in bearings upon such plates, and it is revolved by suitable power. There will usually be a crank-handle, as this machine can be run by hand-power.

The periphery of this cylinder $a$ is corrugated or roughened, to form the hulling-surface.

The plates $b$ $b$ are kept apart by the V-shaped cross-pieces $d$ $d$, that are bolted into place, so as to leave box-shaped openings with parallel sides around the cylinder $a$, and into these openings I introduce blocks $e$ $e$, that are formed with flanges $f$, resting upon the edges of the cross-pieces $d$, so as to prevent them approaching the cylinder $a$, and there are cross-rods $g$ that hold the blocks $e$ in place. There may be adjusting-screws through the edges, resting upon the cross-pieces $d$, to adjust their position, and it is preferable to introduce leather or other yielding material in a groove in the block $e$, beneath the cross-rod $g$, so as to prevent the block being held in place too rigidly.

The rubber sections $k$ are made with roughened surfaces, formed by diamond-shaped projections, having inclined surfaces standing in the direction in which the berries and grains of coffee are forced against them, as seen in Fig. 1, and each of these rubber sections is fitted with studs $l$, passing through the plate $e$ and pressed toward $a$ by springs $s$, the extent of motion being limited by cross-pins through the said studs.

It will now be understood that the rubbers are to be adjusted so as to act upon the coffee-berries supplied through the hopper and moved on through the machine by the revolution of the cylinder $a$. Care must be taken to allow sufficient space to prevent the grains of coffee being cracked, but the hulls will be broken and split off, and the skin of the kernel will be rubbed, loosened, and detached by the action of the diamond projections upon the surfaces of the rubbers, and these rubbers yield to the respective coffee-berries, or to lumps of foreign substances, as they pass into the machine, so that the parts of the machine are not broken, but the hulls are cracked, peeled off, and the skin separated, so that a winnowing operation adapts the coffee for market.

When this machine is to be used for polishing the coffee, the rubbers may be removed and brushes substituted, so that the cylinder may carry the coffee around in contact with the brushes.

I claim as my invention—

1. The combination, with the cylinder $a$ and plates $b$, of the V-shaped cross-pieces $d$, blocks $e$, and elastic rubbers $k$, substantially as set forth.

2. In a coffee-hulling machine, the combination, with the cylinder $a$, side plates $b$, and V-shaped cross-pieces $d$, of the blocks $e$ and yielding rubbers, held in place by the cross-rods $g$, substantially as set forth.

Signed by me this 28th day of March, A. D. 1877.

J. H. PENDLETON.

Witnesses:
GEO. T. PINCKNEY,
CHAS. H. SMITH.